US010693332B2

United States Patent
Jelden et al.

(10) Patent No.: US 10,693,332 B2
(45) Date of Patent: Jun. 23, 2020

(54) ROTOR OF AN ELECTRIC MACHINE, ELECTRIC MACHINE, AND METHOD FOR PRODUCING A ROTOR OF AN ELECTRIC MACHINE

(71) Applicant: Volkswagen Aktiengesellschaft, Wolfsburg (DE)

(72) Inventors: Hanno Jelden, Gifhorn (DE); Eike Hermann Timm, Braunschweig (DE); Thomas Budde, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 191 days.

(21) Appl. No.: 15/522,095

(22) PCT Filed: Oct. 7, 2015

(86) PCT No.: PCT/EP2015/073150
§ 371 (c)(1),
(2) Date: Apr. 26, 2017

(87) PCT Pub. No.: WO2016/066389
PCT Pub. Date: May 6, 2016

(65) Prior Publication Data
US 2018/0262070 A1  Sep. 13, 2018

(30) Foreign Application Priority Data
Oct. 29, 2014  (DE) .......................... 10 2014 222 044

(51) Int. Cl.
*H02K 1/27* (2006.01)
*H02K 29/03* (2006.01)

(52) U.S. Cl.
CPC ............. *H02K 1/278* (2013.01); *H02K 29/03* (2013.01); *H02K 2201/03* (2013.01); *H02K 2201/06* (2013.01); *H02K 2213/03* (2013.01)

(58) Field of Classification Search
CPC ............... H02K 1/278; H02K 2201/03; H02K 2201/06; H02K 2213/03; H02K 29/03
(Continued)

(56) References Cited

U.S. PATENT DOCUMENTS 5,168,953 A   12/1992  Naito
6,707,209 B2   3/2004  Crapo et al.
(Continued)

FOREIGN PATENT DOCUMENTS

CN   101572448 A   11/2009
DE   41 12 906 A1   10/1991
(Continued)

OTHER PUBLICATIONS

Search report for Chinese Patent Application No. 201580056339.6, dated Sep. 5, 2018.
(Continued)

*Primary Examiner* — Alfonso Perez Borroto
*Assistant Examiner* — Ahmed Elnakib
(74) *Attorney, Agent, or Firm* — Pearl Cohen Zedek Latzer Baratz LLP (57) ABSTRACT

A rotor of an electric machine has a circumferential surface and a permanent-magnet structure on the circumferential surface. A contour of the permanent-magnet structure has a stepped section with several steps, whereby each step has a first extension that is oriented essentially perpendicularly to the circumferential direction of the circumferential surface as well as a second extension that is oriented parallel to the circumferential direction and that connects the first extension to a first extension of an adjacent step. The first (Continued)

extension of a first step differs from the first extension of a second step that is adjacent to the first step and/or the second extension of a first step differs from the second extension of the second step.

12 Claims, 3 Drawing Sheets

(58) Field of Classification Search
USPC .................................................. 310/156.47
See application file for complete search history.

(56) References Cited

U.S. PATENT DOCUMENTS

| | | | | |
|---|---|---|---|---|
| 2002/0067092 | A1* | 6/2002 | Crapo | H02K 1/278 |
| | | | | 310/156.47 |
| 2002/0130577 | A1 | 9/2002 | Yuzuru et al. | |
| 2004/0124728 | A1* | 7/2004 | Yamaguchi | H02K 1/278 |
| | | | | 310/156.25 |
| 2004/0164635 | A1* | 8/2004 | Takahashi | H02K 29/03 |
| | | | | 310/156.47 |
| 2005/0017590 | A1* | 1/2005 | Ionel | H02K 1/2733 |
| | | | | 310/156.47 |
| 2007/0080597 | A1* | 4/2007 | Suzuki | H02K 1/2733 |
| | | | | 310/156.47 |
| 2007/0205689 | A1* | 9/2007 | Nemoto | H02K 29/03 |
| | | | | 310/12.22 |
| 2008/0036215 | A1* | 2/2008 | Gizaw | H02K 1/16 |
| | | | | 290/55 |
| 2009/0184602 | A1* | 7/2009 | Braun | H02K 1/278 |
| | | | | 310/216.112 |
| 2009/0224619 | A1 | 9/2009 | Okubo | |
| 2009/0224627 | A1* | 9/2009 | Hino | H02K 1/276 |
| | | | | 310/216.077 |
| 2010/0052466 | A1* | 3/2010 | Vollmer | H02K 1/278 |
| | | | | 310/216.012 |

FOREIGN PATENT DOCUMENTS

| | | |
|---|---|---|
| DE | 10 2004 053 488 A1 | 8/2005 |
| DE | 10 2005 015 657 A1 | 10/2006 |
| DE | 10 2010 049 054 A1 | 4/2012 |
| JP | H11-98 729 | 4/1999 |
| JP | 2004-180491 A | 6/2004 |
| JP | 2010-259 242 A | 11/2010 |
| KR | 10-1999-0061521 A | 8/2000 |

OTHER PUBLICATIONS

Fei, W. et al. "A new technique of cogging torque suppression in direct-drive permanent magnet brushless machines", Electric Machines and Drives Conference, 2009 IEMDC '09. IEEE International, IEEE, Piscataway, NJ, USA May 3, 2009, pp. 9-16.

Gulec et al. "Magnet asymmetry in reduction of cogging torque for integer slot axial flux permanent magnet motors", IET Electric Power Applications, IET, UK, vol. 8, No. 5, May 1, 2014, pp. 189-198.

Search report for German Patent Application No. 10 2014 222 044.0, dated Jul. 2, 2015.

International Search Report of PCT Application No. PCT/EP2015/073150, dated May 11, 2016.

* cited by examiner

ROTOR OF AN ELECTRIC MACHINE, ELECTRIC MACHINE, AND METHOD FOR PRODUCING A ROTOR OF AN ELECTRIC MACHINE

CROSS-REFERENCE TO RELATED APPLICATIONS

This application is a National Phase Application of PCT International Application No. PCT/EP2015/073150, International Filing Date Oct. 7, 2015, claiming priority of German Patent Application No. 10 2014 222 044.0, filed Oct. 29, 2014, which is hereby incorporated by reference in its entirety.

FIELD OF THE INVENTION

The invention relates to a rotor of an electric machine, to an electric machine with such a rotor and to a method for producing such a rotor of an electric machine.

BACKGROUND OF THE INVENTION

Electric machines normally have a rotor and a stator which can be structured in different ways. For instance, magnetic components in the stator or in the rotor can have uniformly configured skewing. For example, the prior art describes a continuous, stepless skewing in the stator by means of a transposition of a laminated core, which, however, requires a laborious winding process, or else it describes a continuous skewing in the rotor, for example, by means of a skewed magnetization of a magnet ring.

Moreover, magnets in the rotor can form uniformly stepped skewing. Such an arrangement can be attained by means of several identical rotor segments that contain permanent magnets and that are twisted relative to each other, whereby the twist angles between adjacent rotor segments are of the same magnitude. Normally, more than two rotor segments are employed as an approximation to the continuous skewing.

During the operation of an electric machine that has a rotor without skewing, a cogging torque is generated that causes fluctuations in the torque of the electric machine. During operation of the rotor, the mechanical twisting of the rotor segments relative to each other causes cogging torques of the appertaining rotor segments which are phase-shifted and superimposed on each other. The total cogging torque can thus be reduced. A suitable cumulative angle of the twist angles can even bring about an extinction of the basic order of the cogging torque and influences the torque ripple under load.

German patent document DE 10 2005 015 657 and German patent application DE 41 12 906 A1 disclose examples of a rotor comprising two or more rotor segments that contain permanent magnets. The rotor segments are arranged so that they can be twisted relative to each other in such a way that, during operation, twisting makes it possible to change between a uniformly stepped arrangement and a rectilinear arrangement of the permanent magnets of the rotor.

During the operation of prior-art electric machines, acoustic noises occur that are caused by a torque ripple. These noises can be perceived as annoying by vehicle occupants. Therefore, these electric machines do not adequately meet the ever-increasing requirements being made in terms of passenger comfort.

SUMMARY OF THE INVENTION

The objective of the present invention is to put forward a rotor of an electric machine, an electric machine with such a rotor and a method for producing such a rotor, all of which, at least partially, overcome the above-mentioned drawbacks.

This objective is achieved by the inventive rotor, by the electric machine and by the method for producing a rotor according to the claims herein.

According to a first aspect, the present invention relates to a rotor of an electric machine, said rotor having a circumferential surface and a permanent-magnet structure on the circumferential surface, whereby
  a contour of the permanent-magnet structure has a first stepped section with several steps, whereby
  each step has a first extension that is oriented essentially perpendicularly to the circumferential direction of the circumferential surface as well as a second extension that is oriented parallel to the circumferential direction and that connects the first extension to a first extension of an adjacent step, whereby
  the first extension of a first step differs from the first extension of a second step that is adjacent to the first step, and/or whereby
  the second extension of a first step differs from the second extension of the second step.

According to a second aspect, the present invention relates to an electric machine with a stator and with a rotor according to the first aspect.

According to a third aspect, the present invention relates to a method for producing a rotor of an electric machine, especially a rotor according to the first aspect, said method comprising:
  providing a first rotor segment having a curved surface and a permanent magnet arranged on a circumferential surface oriented coaxially to the curved surface;
  providing a second rotor segment that is configured so as to be identical or similar to the first rotor segment;
  arranging the second rotor segment on the first rotor segment, whereby the second rotor segment is twisted relative to the first rotor segment by a first twist angle;
  connecting the second rotor segment to the first rotor segment;
  providing a third rotor segment that is configured so as to be identical or similar to the first and the second rotor segments;
  arranging the third rotor segment on the second rotor segment, whereby the third rotor segment is twisted relative to the second rotor segment by a second twist angle that differs from the first twist angle; and
  connecting the third rotor segment to the second rotor segment.

Other advantageous configurations of the invention can be gleaned from the subordinate claims and from the description below of preferred embodiments of the present invention.

An inventive rotor of an electric machine has a circumferential surface and a permanent-magnet structure on the circumferential surface. The circumferential surface can be a surface that is at a distance from and oriented coaxially to a peripheral surface of the rotor upon which the magnet structure acts, for example, it is embedded into a rotor body, or else it can be a surface that forms a peripheral surface of the rotor. The electric machine can be a permanent-magnet-excited synchronous machine, for example, a permanent-magnet-excited synchronous with a reluctance component. The electric machine can be a traction drive. The permanent-magnet structure has a contour having a first stepped section with several steps. Each step has a first extension that is oriented essentially perpendicular to the circumferential direction of the circumferential surface as well as a second extension that is oriented parallel to the circumferential direction and that connects the first extension to a first extension of an adjacent step. In this context, the first extension of a first step differs from the first extension of a second step that is adjacent to the first step. As an alternative or in addition, the second extension of a first step differs from the second extension of the second step.

The differing first and/or second extensions of adjacent steps result in a non-uniform skewing of the stepped section of the permanent-magnet structure. The irregular skewing brings about an efficient reduction in the torque ripple and thus in the noises generated during the operation of the electric machine. Therefore, thanks to the rotor according to the invention, the non-uniform skewing of the stepped section reduces the annoyance to passengers caused by disturbing noises during the operation of the electric machine, and the acoustic properties of the electric machine are optimized.

For instance, adjacent steps of the stepped section of the permanent-magnet structure have identical first extensions and different second extensions. Such a stepped section of the permanent-magnet structure can be implemented with permanent magnet elements of the same shape and size, for example, standardized permanent magnets, or else with identical rotor segments of the same shape and size into which permanent magnets are embedded, or that contain permanent magnets, thereby avoiding the need for additional effort to provide permanent-magnet elements or rotor segments of a different shape and size. As an alternative, adjacent steps can have different first extensions and identical second extensions. As additional alternatives, adjacent steps can have different first extensions and different second extensions.

The stepped section can be configured point-symmetrically, whereby a center of symmetry is situated on the circumferential surface in a plane of symmetry that is oriented parallel to the circumferential direction and that runs through the middle of the circumferential surface, for example, the middle of a rotor. In the case of a rotor consisting of several rotor segments, the center of symmetry can be situated on the circumferential surface, for example, in a plane of symmetry that is oriented parallel to the circumferential direction and that is located in the middle of an axial length over all of the rotor segments (axial length of the rotor). For instance, the center of symmetry can be located in the middle of the first extension of a step arranged in the middle, and the second extension of the step located in the middle can be identical to the second extension of an adjacent step. Adjacent to each of these steps, each step can have a different second extension, whereby all of the steps have an identical first extension. Alternatively, the center of symmetry can be located in the middle of the second extension of a step arranged in the middle, and the second extension of the step arranged in the middle can differ from identical second extensions of the steps that are adjacent to the step arranged in the middle, whereby all of the steps have an identical first extension.

The operation of an electric machine can encompass motor-driven operation having a first direction of rotation (quadrant I), generator-driven operation in the first direction of rotation (quadrant II), generator-driven operation in a second direction of rotation counter to the first direction of rotation (quadrant III) and/or motor-driven operation in the second direction of rotation (quadrant IV). The point-symmetrical configuration of the stepped section can translate into an optimization of the acoustic properties of the electric machine, especially an electric machine that is operated in more than one quadrant. It can be achieved that the same acoustic behavior of the electric machine is present during motor-driven and generator-driven operation. Therefore, the point-symmetrical configuration of the stepped section can preferably be employed for traction drives that are operated in two or even all four quadrants.

In the case of electric machines that are operated in only one quadrant, completely asymmetrical configurations of the stepped section can be used, as a result of which additional potential can be attained. For example, the first and/or second extensions of all of the steps can be completely different.

According to the invention, each step has a first extension that is oriented essentially perpendicular to the circumferential direction of the circumferential surface. The term "essentially" is to be understood here to refer to each orientation of the first extension between an orientation that is perpendicular to the circumferential direction and an orientation that is slanted by a helical angle of 20° relative to a perpendicular of the circumferential direction. For instance, the first extension can be oriented perpendicular to the second extension or else it can enclose an angle between 70° and 110° with the second extension.

The circumferential surface can have the shape of a lateral surface of a cylinder, especially of a circular cylinder. The rotor can be configured as an internal rotor and can have a circular-cylindrical basic structure into which the circumferential surface is embedded, whereby the circumferential surface is oriented coaxially to a lateral surface of the circular-cylindrical basic structure. A rotor configured as an internal rotor can also have a circular-cylindrical basic structure whose lateral surface forms the circumferential surface onto which the permanent-magnet structure is placed. Alternatively, the rotor can be configured as an external rotor and can have a basic structure with a circular-cylindrical recess, for instance, a hollow-cylindrical basic structure, into which the circumferential surface is embedded, whereby the circumferential surface is oriented coaxially to an inner surface of the basic structure. A rotor configured as an external rotor can also have a hollow-cylindrical basic structure whose inner surface forms the circumferential surface onto which the permanent-magnet structure is placed.

The permanent-magnet structure of the rotor according to the invention can have several permanent-magnet elements. Each permanent-magnet element can have a rectangular, a trapezoidal or a parallelogram-shaped base area. The permanent-magnet structure of the rotor according to the invention can have several magnetic poles which are formed by a permanent-magnet element that functions as a magnetic pole, or else several adjacent permanent-magnet elements that function as magnetic poles. For example, permanent-magnet elements can be used that are configured so as to be flat and whose bottom is only partially in contact with the circumferential surface. In some embodiments, the permanent magnets can have a rectangular base area and can be arranged at a distance from the surface, whereby each permanent-magnet element functions as a magnetic pole. In some examples, two permanent magnets that are, for instance, at an angle with respect to each other and arranged at a distance from the circumferential surface, can form a magnetic pole.

As an alternative, or in addition, each permanent-magnet element can preferably have a curvature that matches the curvature of the circumferential surface. In the case of rotors with a basic structure whose surface forms the circumferential surface, the permanent magnets can have a rectangular base area as well as a top and a bottom, whereby the top and the bottom are curved so as to match the circumferential surface, and the bottom of the permanent-magnet elements is in contact with the circumferential surface. As an alternative, the permanent-magnet elements can have a curved bottom with which they are in contact with the circumferential surface, and they can also have any desired top that is formed, for instance, by two flat surfaces that are slanted with respect to each other. The shape of the permanent-magnet elements, however, is not restricted to the examples cited.

The rotor can have several segments, whereby each rotor segment can have a curved surface, especially a peripheral curved surface. The surface can have several recesses and/or projections or else it can be configured so as to be smooth. For example, the rotor segments can be configured as circular disks or ring elements with which a cylindrical basic structure of the rotor can be formed. The curved surfaces of the rotor segments are then oriented coaxially to the circumferential surface of the rotor to which the permanent-magnet elements are attached. The permanent-magnet elements preferably have an extension perpendicular to the circumferential direction that is smaller than the axial length of the rotor segment or equal to the axial length of the rotor segment and that is preferably smaller than the axial length of the rotor segment by 10% of the axial length of the rotor segment at the maximum. Preferably, the rotor segments are firmly connected to each other or to a shared component, for instance, a bearing element, with a positive fit, a non-positive fit and/or an integrally bonded connection, for example, they are shrunk on, glued, screwed, riveted or soldered.

A permanent-magnet element arranged in or on a rotor segment can represent a step of the stepped section of the permanent-magnet structure. In this context, the first extension of each step can correspond to the axial length of the associated rotor segment, and the second extension of each step can be achieved by twisting the rotor segment of this permanent magnet towards an adjacent rotor segment.

The rotor segments with the permanent-magnet elements can be, for example, laminated core segments containing magnets which can also be employed for structuring rotors of known electric machines. This makes it possible to optimize the acoustic properties of the rotor or electric machine, without any need to change the basic design or the serial production concept.

The rotor segments of the permanent-magnet elements of an individual rotor are shaped, for example, identically, and they have permanent-magnet elements at identical places. The non-uniform stepped section of the permanent-magnet structure can be formed by twisting adjacent rotor segments when the rotor segments are being stacked, so that different second extensions of adjacent steps are created. In this context, there is no need for additional work in order to provide different permanent-magnet elements, but rather, all that is necessary is to adapt a process parameter of a joining robot to the desired twist.

As an alternative, the axial lengths of the rotor segments of an individual rotor can differ from each other, as a result of which a rotor with a stepped section is created whose steps have different first extensions.

The technique of stacking and twisting rotor segments having permanent-magnet elements to form a rotor is employed, for example, in the production of rotors for permanent-magnet-excited synchronous machines with a reluctance component. For rotors of other electric machines, a different basic structure can be used, for instance, a single-part cylindrical basic structure in which the permanent-magnet structure is installed or onto which the permanent-magnet structure is placed.

The stepped section of the permanent-magnet structure can have a dimension in the circumferential direction that extends over an arc of a circle having a mid-point angle $\alpha$ (cumulative angle $\alpha$). For example, the first extension of a step arranged on an edge of the circumferential surface is located on an intersecting plane that intersects an axis of rotation of the circumferential surface as well as the circumferential surface, and the first extension of a step arranged on an another edge that is opposite from the first edge is located on an intersecting plane that is slanted by an angle $\alpha$ relative to the first intersecting plane. The mid-point angle influences the torque magnitude as well as the torque ripple. The following can hold true for the mid-point angle $\alpha$:

$$\alpha=(360°/BA)\pm 0.3*(360°/BA), \quad (I)$$

wherein BA stands for a basic arrangement of the electric machine that is defined as the smallest common multiple of the number of slots of a stator of the electric machine and of the number of poles of the rotor of the electric machine. In some embodiments based on a basic arrangement of 48, $\alpha=6°$ holds true for the mid-point angle. In this case, an increased torque can be obtained in comparison to larger or smaller mid-point angles.

The second extension of individual steps of the stepped section of the permanent-magnet structure can have a dimension in the circumferential direction that extends over an arc of a circle having a mid-point angle $\beta$. The mid-point angle $\beta$ can be compared to the twist angle of adjacent rotor segments. The following can apply for the mid-point angle $\beta_i$ of an $i^{th}$ step:

$$\beta_i=(\alpha/n)*af \quad (II)$$

and $$\Sigma\beta_i=\alpha, \quad (III)$$

wherein n stands for the number of steps of the rotor and af is an asymmetry factor for which, for example, the following applies: $0 \geq af \geq 4$. In some embodiments, the rotor can consist of five identical rotor segments with magnets and the cumulative angle $\alpha$ can be equal to 6°. Then the first rotor segment and the second rotor segment can be twisted relative to each other by $\beta=1°$, the second rotor segment and the third rotor segment by $\beta=2°$, the third rotor segment and the fourth rotor segment by $\beta=2°$, and the fourth rotor segment and the fifth rotor segment by $\beta=1°$. In some embodiments, a rotor can be formed by four identical rotor segments with magnets and the cumulative angle $\alpha$ can be equal to 5.7°. Then the first rotor segment and the second rotor segment (adjacent to the first rotor segment) as well as the third rotor segment and the fourth rotor segment (adjacent to the third rotor segment) can be twisted relative to each other by $\beta=2°$, and the second rotor segment and the third rotor segment (adjacent to the second rotor segment) by $\beta=1.7°$. However, the selection of the angle $\beta$ for different steps of the rotor is not restricted to the examples given.

The contour of the permanent-magnet structure can have a second stepped section whose shape corresponds to the shape of the first stepped section and which is shifted along the circumferential direction relative to the first section. This can be achieved, for instance, by means of permanent magnets having a rectangular, trapezoidal or a parallelogram-shaped base area, as described above.

In some embodiments, the circumferential surface of the rotor can have a plurality of permanent-magnet structures that are shaped as described above. This translates into a largely continuous running of the rotor as well as a quiet and reliable operation of the electric machine.

The present invention also relates to an electric machine having a stator and a rotor, as described above. The electric machine is, for example, a permanent-magnet-excited synchronous machine. The rotor can be an internal rotor and can be mounted inside a stator that has a circular-cylindrical recess. Alternatively, the rotor can be an external rotor that is mounted in such a way that it can be turned around the stator, which has a circular-cylindrical shape.

The present invention also relates to a motor vehicle having an electric machine that has a rotor of the type described above. The motor vehicle can be an electric vehicle having the electric machine according to the invention as its only drive, or else it can be a hybrid vehicle having an internal combustion engine and the electric machine as its drives.

The invention also relates to a method for producing a rotor of an electric machine, for instance, a permanent-magnet-excited synchronous machine. The rotor can be configured as described above. The method according to the invention comprises the following: providing a first rotor segment having a curved surface as well as a permanent-magnet element arranged on a circumferential surface that is oriented coaxially to the curved surface; providing a second rotor segment that is configured so as to be identical or similar to the first rotor segment; arranging the second rotor segment on the first rotor segment, whereby the second rotor segment is twisted relative to the first rotor segment by a first twist angle; connecting the second rotor segment to the first rotor segment; providing a third rotor segment that is configured so as to be identical or similar to the first and second rotor segments; arranging the third rotor segment on the second rotor segment, whereby the third rotor segment is twisted relative to the second rotor segment by a second twist angle that differs from the first twist angle; and connecting the third rotor segment to the second rotor segment.

This provides a rotor having rotor segments that each have a curved surface, and a permanent-magnet element that is arranged on a circumferential surface that is oriented coaxially to the surface and that is embedded in the appertaining rotor segment. The permanent-magnet elements form a permanent-magnet structure whose contour has a first stepped section with several steps, whereby each step has a first extension that is oriented essentially perpendicular to the circumferential direction of the circumferential surface as well as a second extension that is oriented parallel to the circumferential direction and that connects the first extension to a first extension of an adjacent step, whereby the second extension of a first step differs from the second extension of a second step that is adjacent to the first step.

Other rotor segments can be added in a corresponding manner.

Providing the rotor segments can include conveying prefabricated rotor segments, for example, on a conveyor belt or else manually, into a joining station. The prefabricated rotor segments can be shaped identically, for instance, they can have the same thickness and the same diameter, and they can have permanent-magnet elements at comparable places. As an alternative, the rotor segments can have different axial lengths. Providing the rotor segments can also include the manufacture of the rotor segments.

The rotor segments can be arranged in that a first rotor segment is provided and a second rotor segment is stacked onto the first rotor segment so as to be twisted relative to the first rotor segment, so that a step represented by the first rotor segment has a first extension. Subsequently, a third rotor segment can be stacked onto the second rotor segment so as to be twisted relative to the second rotor segment, so that the step represented by the second rotor segment has a first extension that differs from the first extension of the step represented by the first rotor segment. Additional rotor segments can be added, whereby the first extension of the steps formed by the third and each additional rotor segment can correspond to the first extension of the steps determined by the second rotor segment, or else it can be different from it. The rotor segments can be arranged by means of one or more robots, for instance, they are shrunk on, glued, screwed, riveted or soldered.

The arranged rotor segments can be connected to each other or to a shared component by means of different joining techniques, for example, by shrinkage, gluing, screwing, riveting and/or soldering.

The individual steps can be carried out in a different sequence, for instance, the joining can take place after or during the arrangement of the second and each additional rotor segment, or else after all of the rotor segments have been arranged.

BRIEF DESCRIPTION OF THE DRAWINGS

Embodiments of the invention will be described below by way of examples and making reference to the accompanying drawings. The latter show the following.

DETAILED DESCRIPTION OF THE DRAWINGS

Figure 1:
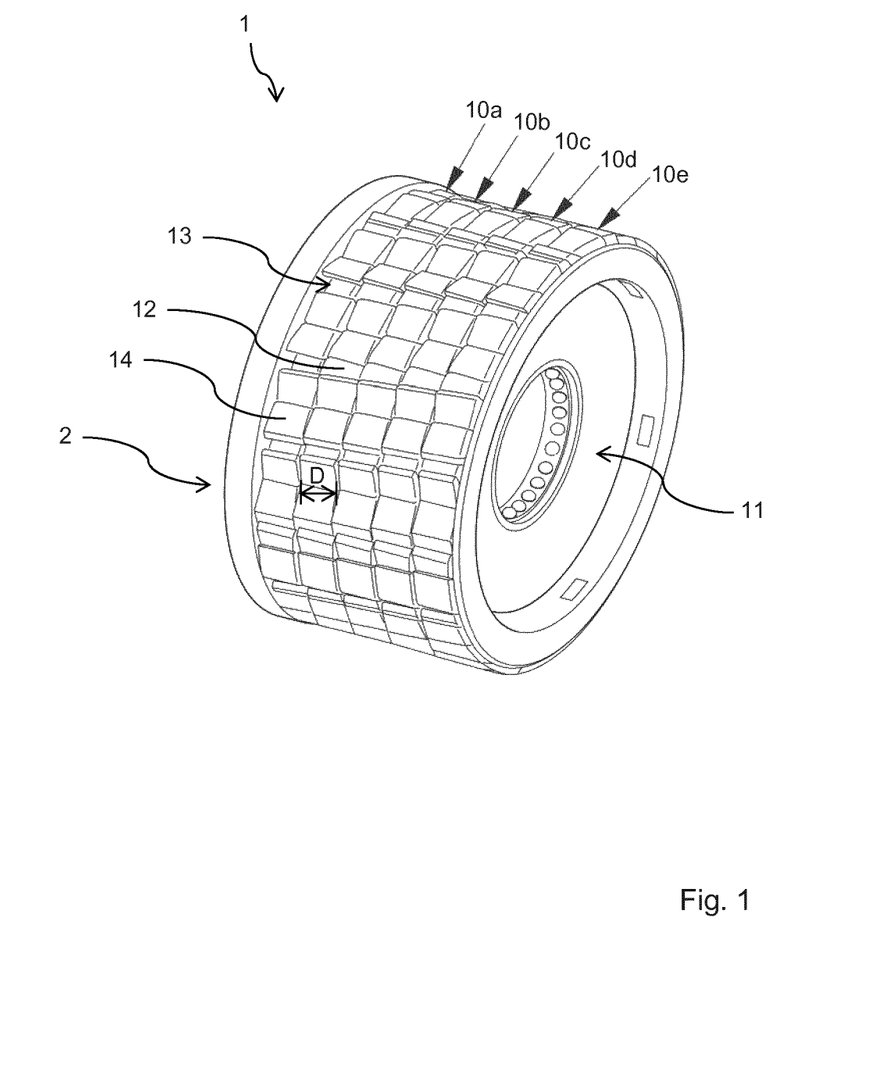
FIG. 1: schematically, a perspective view of a rotor according to the invention, with permanent-magnet elements.
Figure 2A:
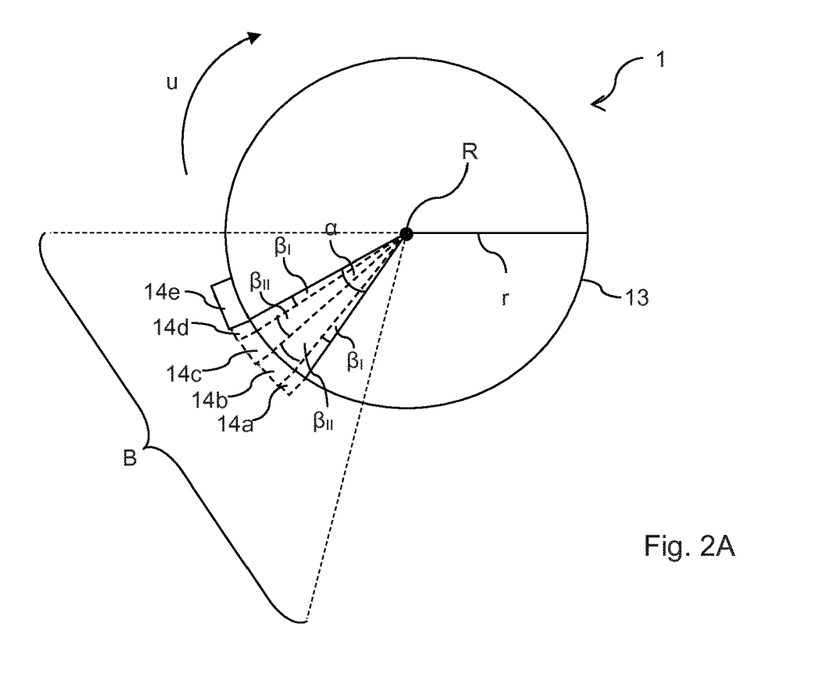
FIG. 2A: a schematic cross section of the rotor.
Figure 2B:
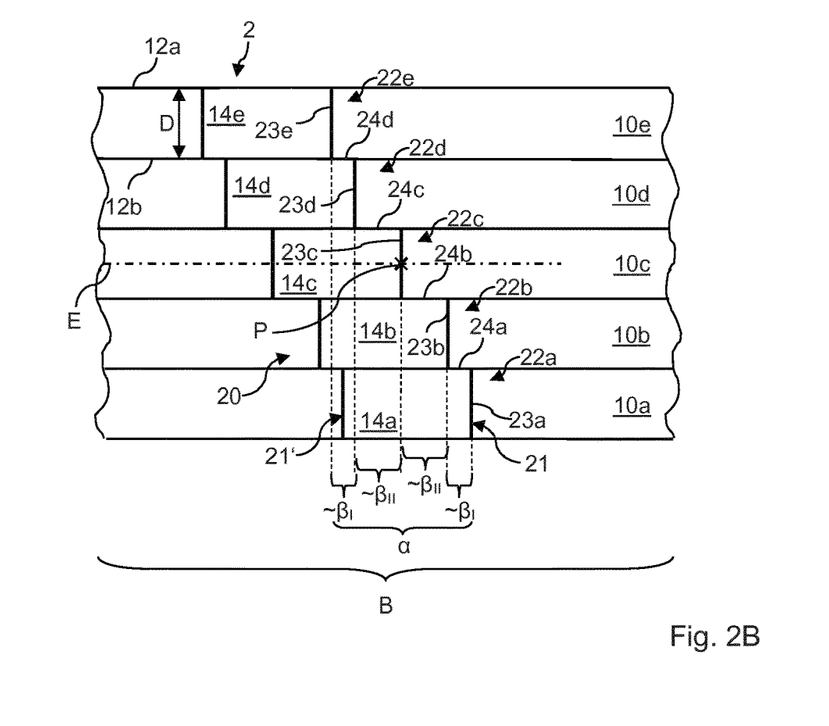
FIG. 2B: a developed area of the rotor shown in an enlarged view.

FIGS. 1, 2A and 2B show an embodiment of a rotor according to the invention, whereby the depictions in FIGS. 2A and 2B are considerably simplified in comparison to the depiction in FIG. 1.

The rotor 1 has a cylindrical basic structure that is formed by five identical ring-shaped rotor segments 10a-10e. The rotor segments 10a-10e are connected to a bearing element 11 that is situated on the inside of the rotor segments 10a-10e and that is firmly connected to them in order to affix them to each other. The bearing element 11 makes it possible for the rotor 1 to be rotated in a circular-cylindrical recess of a stator (not shown) that has several coils.

The rotor segments 10a-10e have a peripheral curved surface (not shown) in the form of an outer lateral surface. There is a curved circumferential surface 12 below the curved surface and arranged coaxially thereto. The circumferential surfaces 12 of the five rotor segments 10a-10e form a total circumferential surface 13 of the rotor 1.

A prescribed number of permanent magnets 14 is placed at regular intervals on the circumferential surface 12 of each rotor segment 10a-10e. The permanent magnet elements 14 are covered by the curved surface of the rotor segments and embedded into the rotor segments. The number of permanent magnet elements 14 is constant for all of the rotor segments 10a-10e. The permanent magnet elements 14 have a rectangular basic shape, whereby one side length of the basic form corresponds to one axial length D of the rotor segments 10a-10e. The bottom of the permanent magnet elements 14 touches the circumferential surface 12 of the appertaining rotor segment and extends between a first edge 12a and a second edge 12b of the circumferential surface 12. Two permanent magnet elements 14 which, in FIG. 1, are oriented so as to be angled with respect to each other and which form a magnetic pole, are shown in simplified form in FIGS. 2A and 2B as one element (magnet pair).

Each permanent magnet 14 of each rotor segment 10a-10b forms a permanent-magnet structure 2. The permanent magnet elements 14 are arranged non-uniformly with respect to each other in the permanent-magnet structure 2. The permanent-magnet structure 2 is now explained in detail making reference to FIG. 2B, whereby FIG. 2B shows an enlarged and developed view of the area of the rotor 1 designated with B.

The permanent-magnet structure 2 has a contour 20 comprising two trapezoidal sections 21, 21' with four complete steps 22a-22d and an incomplete step 22e. Each complete step 22a-22d has a first extension 23a-23d and a second extension 24a-24d. The first extension 23a-23d is oriented perpendicular to the circumferential direction of the circumferential surface which is indicated in FIG. 2A by the arrow u, or else parallel to an axis of rotation of the rotor 1, which is indicated by the reference symbol R. The second extension 24a-24d is oriented parallel to the circumferential direction u and it connects the first extension 23a-23d to a first extension 23b-23e of an adjacent step 22b-22e. The second extension 24a, 24d of the complete steps 22a, 22d, which match each other, are half as large as the second extensions 24b, 24c of the complete steps 22b, 22c, which likewise match each other. The first extension (23a-23e) is determined by the axial length D of the rotor segments 10a-10e and is constant for all of the steps 22a-22e.

The described permanent-magnet structure 2 is created in that identical rotor segments 10a-10e, which have permanent-magnet elements 14 in comparable places, are stacked and pressed against each other so as to be twisted. Thus, the second rotor segment 10b (indicated in FIG. 2A by the permanent-magnet element 14b) is shifted relative to the first rotor segment 10a, which represents the first step 22a (the lowermost step in FIG. 2B), by a twist angle $\beta_I=1°$. In this manner, the length of the extension of the first stage 22a is proportional to $\beta_I$. The third segment 10c is shifted relative to the second rotor segment 10b, which represents the second step 22b, by a twist angle $\beta_{II}=2°$, so that the length of the extension of the second step 22b is proportional to $\beta_{II}$. The fourth rotor segment 10d is shifted relative to the third rotor segment 10c, which represents the third step 22c, by a twist angle $\beta_{II}=2°$, so that the length of the extension of the third step 22c is once again proportional to $\beta_{II}$. The fifth rotor segment 10e is shifted relative to the fourth rotor segment 10d, which represents the fourth step 22d, by a twist angle $\beta_I=1°$, so that the length of the extension of the fourth step 22d is proportional to $\beta_I$. The stepped section 21 of the described permanent-magnet structure 2 is thus configured point-symmetrically to the point P as the center of symmetry that is located in a plane of symmetry E that is oriented parallel to the circumferential direction u and that runs through the middle of the circumferential surface 13.

In the circumferential direction u, the stepped section 21 bridges a length that is proportional to the twist angle α of the fifth rotor segment 10e relative to the first rotor segment 10a, which is $\alpha=2*\beta_{II}=6°$ in the present embodiment.

Figure 3:
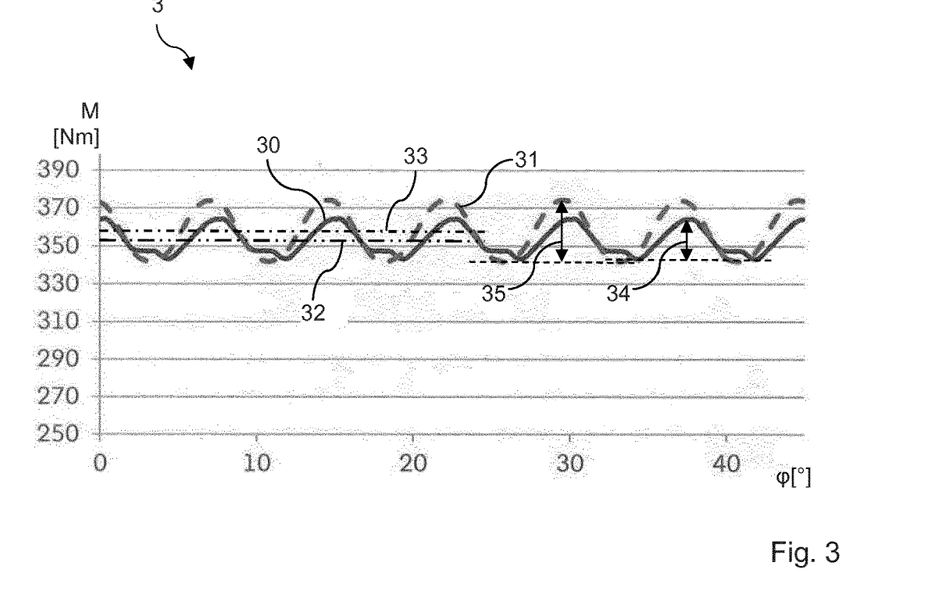
FIG. 3: a depiction of the torque ripple of various rotors.

FIG. 3 shows a diagram 3 that depicts an oscillating torque curve 30 of the rotor 1 described with reference to FIGS. 1, 2A and 2B as a function of a rotor position φ. For comparison purposes, an oscillating torque curve 31 of a comparative rotor with permanent magnets that are uniformly stepped is shown, whereby adjacent rotor segments of the comparative rotor are twisted relative to each other by 1.5°. A mean torque 32 of the rotor 1 is reduced in comparison to a mean torque 33 of the comparative rotor. At the same time, however, there is also a marked reduction in the ripple of the rotor 1, which is defined by the amplitude 34 of the torque curve 30, in comparison to the ripple of the comparative rotor, which is defined by the amplitude 35 of the torque curve 31. The reduced ripple of the rotor 1 accounts for the fact that the electric machine generates less noise during operation than an electric machine with the comparative rotor, whereby the torque losses are very small.

Figure 4:
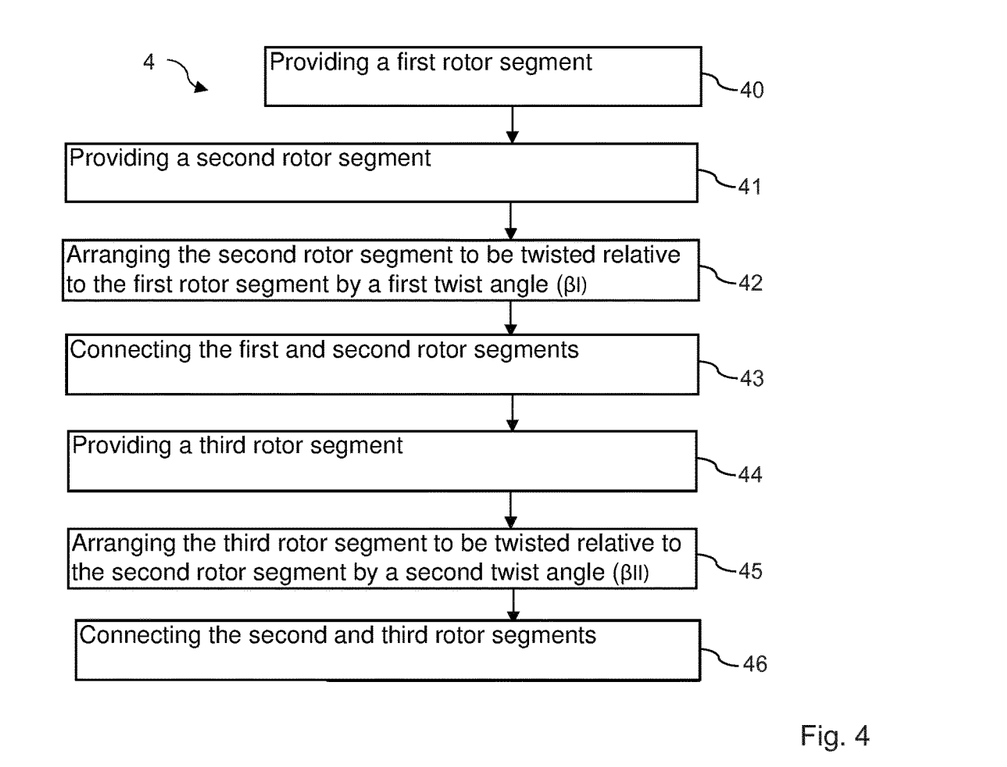
FIG. 4: a flow chart of a method for producing the rotor according to the invention.

FIG. 4 shows a flowchart of a method 4 according to the invention for producing a rotor 1. At position 40, a first rotor segment 10a having a curved surface and having a permanent-magnet element 14 arranged on a circumferential surface oriented coaxially to the curved surface 12 is provided in that the first rotor segment 10a is conveyed on a conveyor belt to a joining station that has a joining robot, the latter then placing the first rotor segment onto a placement surface.

At position 41, a second rotor segment 10b that is configured in a corresponding manner to the first rotor segment 10a is provided in that the second rotor segment 10b is conveyed on the conveyor belt to a joining station that has the joining robot.

At position 42, the second rotor segment 10b is arranged on the first rotor segment 10a, whereby the second rotor segment 10b is twisted relative to the first rotor segment 10a by a first twist angle $\beta_I=1°$. In this process, the joining robot grips the second rotor segment 10b and twists the second rotor segment 10b by a twist angle $\beta_I=1°$ relative to the first rotor segment 10a.

At position 43, the second rotor segment 10b is connected to the first rotor segment 10a. For this purpose, the second rotor segment 10b is shrunk on together with the first rotor segment 10a.

At position 44, a second rotor segment 10b that is configured in a corresponding manner to the first rotor segment 10a is provided in that the second rotor segment 10b is conveyed on the conveyor belt to a joining station that has the joining robot.

At position 45, the third rotor segment 10c is arranged on the second rotor segment 10b, whereby the third rotor segment 10c is twisted relative to the second rotor segment 10b by a second twist angle $\beta_{II}=2°$. In this process, the joining robot grips the third rotor segment 10c and twists the third rotor segment 10c by a twist angle $\beta_{II}=2°$ relative to the second rotor segment 10b.

At position 46, the third rotor segment 10c is shrunk together with the second rotor segment 10b.

By means of this method, the rotor segments are arranged with their permanent-magnet elements 14 with respect to each other in such a way as to create the permanent-magnet structure 2, as described above in detail.

Thanks to the method described above, it is possible without much effort to produce irregularly stepped permanent-magnet structures in that only the twist angles $\beta_I$ and $\beta_{II}$ are changed by setting the joining parameters of the joining robot.

LIST OF REFERENCE NUMERALS 1 rotor
10a-10b ring-shaped rotor segment
11 bearing element
12 curved surface of a rotor segment
12a first edge of the rotor segment
12b second edge of the rotor segment
13 circumferential surface of the rotor
14, 14a-14e permanent-magnet element
20 contour
2 permanent-magnetic structure
21, 21' stepped section
22a-22e step of the stepped section
23a-23e first extension of the steps
24a-24e second extension of the steps
3 diagram
30 torque curve of the rotor 1
31 torque curve of the comparative rotor
32 mean torque of the rotor 1
33 mean torque of the comparative rotor
34 amplitude of the torque curve 30
35 amplitude of the torque curve 31
4 method for producing the rotor
40 providing a first rotor segment
41 providing a second rotor segment
42 arranging the second rotor segment
43 connecting the first and second rotor segments
44 providing a third rotor segment
45 arranging the third rotor segment
46 connecting the second and third rotor segments
B developed area
D segment thickness
E plane of symmetry
$l_I$, $l_{II}$ length of the second extension
$l_{TA}$ length of the total twist
M torque
P point as the center of symmetry
R axis of rotation
r radius
u circumferential direction
α total twist angle
$\beta_I$, $\beta_{II}$ twist angle of individual rotor segments
φ rotor position

The invention claimed is:

1. A rotor of an electric machine, said rotor having
a first rotor segment;
a second rotor segment connected onto the first rotor segment, wherein the second rotor segment is twisted relative to the first rotor segment by a first twist angle;
a third rotor segment connected onto the second rotor segment, wherein the third rotor segment is twisted relative to the second rotor segment by a second twist angle that differs from the first twist angle;
a fourth rotor segment connected onto the third rotor segment, wherein the fourth rotor segment is twisted relative to the third rotor segment by the second twist angle; and
a fifth rotor segment connected onto the fourth rotor segment, wherein the fifth rotor segment is twisted relative to the fourth rotor segment by the first twist angle; wherein each of the first rotor segment, second rotor segment, third rotor segment, fourth rotor segment and fifth rotor segment have a curved surface as well as a permanent-magnet structure arranged on a circumferential surface that is oriented coaxially to the curved surface;
wherein a contour of the permanent-magnet structure has a stepped section with several steps, wherein each step has a first extension that is oriented essentially perpendicularly to a circumferential direction of the circumferential surface as well as a second extension that is oriented parallel to the circumferential direction and that connects the first extension to a first extension of an adjacent step,
wherein the first extension of a first step differs from the first extension of a second step that is adjacent to the first step, and
wherein the second extension of the first step differs from the second extension of the second step.

2. The rotor according to claim 1, whereby the stepped section is point-symmetrical, wherein a center of symmetry is situated in a plane of symmetry that is oriented parallel to the circumferential direction and that runs through a middle of the circumferential surface.

3. The rotor according to claim 1, whereby the permanent-magnet structure has several permanent-magnet elements.

4. The rotor according to claim 3, whereby
each permanent-magnet element has a rectangular, a trapezoidal or a parallelogram-shaped base area, and/or
at least one permanent-magnet element functions as a magnetic pole.

5. The rotor according to claim 3, whereby the rotor has several rotor segments that each has a curved surface and that are firmly connected to each other, whereby the circumferential surface is arranged coaxially to the surfaces of the rotor segments, and whereby the permanent-magnet elements are embedded into the rotor segments or are attached to the surfaces of the segments.

6. The rotor according to claim 5, whereby each rotor segment represents a step of the stepped section, whereby
the first extension of each step is smaller than an axial length of the appertaining rotor segment or equal to the axial length, and
the second extension of each step is achieved by a twist angle of the appertaining rotor segment relative to an adjacent rotor segment.

7. The rotor according to claim 1, whereby a dimension of the stepped section in the circumferential direction extends over an arc of a circle having a mid-point angle.

8. The rotor according to claim 1, whereby the contour of the permanent-magnet structure has a second stepped section whose shape corresponds to a shape of the first stepped section and which is shifted along the circumferential direction relative to the first stepped section.

9. An electric machine having a stator and a rotor according to claim 1.

10. The rotor according to claim 1, wherein the first twist angle is half as large as the second twist angle.

11. A method for producing a rotor of an electric machine, comprising the following:
providing a first rotor segment, a second rotor segment, a third rotor segment, a fourth rotor segment, and a fifth rotor segment, each having a curved surface as well as a permanent-magnet element arranged on a circumferential surface that is oriented coaxially to the curved surface, wherein:
a contour of the permanent-magnet structure has a stepped section with several steps, wherein each step has a first extension that is oriented essentially perpendicularly to a circumferential direction of the circumferential surface as well as a second extension that is oriented parallel to the circumferential direction and that connects the first extension to a first extension of an adjacent step, the first extension of a first step differs from the first extension of a second step that is adjacent to the first step, and wherein the second extension of the first step differs from the second extension of the second step;

connecting the second rotor segment onto the first rotor segment, whereby the second rotor segment is twisted relative to the first rotor segment by a first twist angle;

connecting the third rotor segment onto the second rotor segment, whereby the third rotor segment is twisted relative to the second rotor segment by a second twist angle that differs from the first twist angle;

connecting the fourth rotor segment onto the third rotor segment, whereby the fourth rotor segment is twisted relative to the third rotor segment by the second twist angle; and connecting the fifth rotor segment onto the fourth rotor segment; whereby the fifth rotor segment is twisted relative to the fourth rotor segment by the first twist angle.

12. The method according to claim 11, wherein the first twist angle is half as large as the second twist angle.

\* \* \* \* \*